(12) United States Patent
Espinosa (10) Patent No.: US 8,806,835 B2
(45) Date of Patent: Aug. 19, 2014

(54) CHECKER NUT FOR LOCKING A THREADED BODY TO A THREADED ROD AND CONCRETE REINFORCEMENT ASSEMBLY

(76) Inventor: Thomas M. Espinosa, Snohomish, WA (US)

(*) Notice: Subject to any disclaimer, the term of this patent is extended or adjusted under 35 U.S.C. 154(b) by 0 days.

(21) Appl. No.: 13/351,916

(22) Filed: Jan. 17, 2012

(65) Prior Publication Data

US 2013/0019559 A1    Jan. 24, 2013

Related U.S. Application Data

(60) Provisional application No. 61/433,354, filed on Jan. 17, 2011.

(51) Int. Cl.
*E04B 1/38* (2006.01)
*E04C 5/16* (2006.01)
*F16B 39/16* (2006.01)
*F16B 39/30* (2006.01)

(52) U.S. Cl.
CPC ............... *F16B 39/30* (2013.01); *E04C 5/166* (2013.01); *F16B 39/16* (2013.01)
USPC ........................................................... 52/698

(58) Field of Classification Search
USPC ............ 52/698; 411/530, 516, 520, 521, 221, 411/237, 926, 247–250, 301–303, 246, 190
See application file for complete search history.

(56) References Cited

U.S. PATENT DOCUMENTS

| | | | |
|---|---|---|---|
| 2,431,627 | A | 11/1947 | Van Winkle, Jr. |
| 5,772,373 | A | 6/1998 | Cronin, II et al. |
| 2002/0192048 | A1 | 12/2002 | Bushell et al. |
| 2003/0035699 | A1 | 2/2003 | Harris |
| 2004/0047709 | A1 | 3/2004 | DiStasio et al. |
| 2005/0028651 | A1 | 2/2005 | Crosser |
| 2007/0154279 | A1 | 7/2007 | Ward et al. |
| 2007/0286699 | A1 | 12/2007 | Rode |
| 2011/0041449 | A1 | 2/2011 | Espinosa |
| 2011/0041450 | A1 | 2/2011 | Espinosa |

OTHER PUBLICATIONS

The International Bureau of WIPO, International Preliminary Report on Patentability, Jul. 25, 2013, PCT/EP2012/021552.

*Primary Examiner* — Mark Wendell
(74) *Attorney, Agent, or Firm* — Shlesinger, Arkwright & Garvey LLP (57) ABSTRACT

A checker nut for locking a threaded body to a threaded rod, comprises a main body portion having a top bearing surface for engaging a threaded body. The main body portion includes a central opening with an inside surface. A female thread is disposed on the inside surface and extends therefrom, the female thread for cooperating with threads on a threaded rod; and the female thread is disposed on the inside surface a distance from the top bearing surface equal to at least one thread required to be passed by a threaded body on a threaded rod.

41 Claims, 13 Drawing Sheets

# CHECKER NUT FOR LOCKING A THREADED BODY TO A THREADED ROD AND CONCRETE REINFORCEMENT ASSEMBLY

RELATED APPLICATIONS

This is a nonprovisional application of provisional application Ser. No. 61/433,354, filed Jan. 17, 2011, the priority benefit of which is hereby claimed.

FIELD OF THE INVENTION

The present invention is generally directed to fasteners and particularly to fasteners used to lock anchor bodies on a rod used for concrete reinforcement.

SUMMARY OF THE INVENTION

The present invention provides a checker nut for locking a threaded body to a threaded rod, comprising a main body portion having a top bearing surface for engaging a threaded body. The main body portion includes a central opening with an inside surface. A female thread is disposed on the inside surface and extends therefrom, the female thread for cooperating with threads on a threaded rod; and the female thread is disposed on the inside surface a distance from the top bearing surface equal to at least a thread portion required to be passed by a threaded body on a threaded rod.

The present invention also provides a checker nut for locking a threaded body to a threaded rod, comprising a main body portion having a top bearing surface for engaging a threaded body; and projections extending from the main body portion. The main body portion including a central opening. A female thread is disposed in the central opening, the thread for cooperating with threads on a threaded rod; and the projections for extending beyond the outer periphery of a threaded body to be locked by the checker nut on a threaded rod, the projections providing leverage to a user to tighten the top bearing surface against the threaded body.

The present invention further provides a checker nut for locking a threaded body to a threaded rod, comprising a main body portion having a top bearing surface for engaging a threaded body; the main body portion including a central opening. A female thread is disposed in the central opening, the thread for cooperating with threads on a threaded rod. A stop member is disposed at a bottom portion of the central opening; and the stop member extends radially inside the central opening.

The present invention further provides a checker nut for locking a threaded body to a threaded rod, comprising a body having a top bearing surface for engaging a threaded body. The body includes a central opening. A female thread is disposed in the central opening, the thread for cooperating with threads on a threaded rod. The body extends beyond the outer periphery of a threaded body to be locked by the checker nut on a threaded rod to provide leverage to a user to tighten the top bearing surface against the threaded body. The body is deformable to develop tension in the threaded rod between the thread and the top bearing surface when the body is tightened against the threaded body.

The present invention provides a concrete reinforcement assembly, comprising a threaded rod; an anchor body threaded to the rod; and a checker nut engaged tight against the anchor body to lock the anchor body in place. The main body portion includes a central opening with a cylindrical inside surface. A female thread is disposed on the cylindrical inside surface and extends therefrom, the female thread for cooperating with threads on the threaded rod; and the female thread is disposed on the cylindrical surface a distance from the top bearing surface equal to at least one thread required to be passed by the anchor body on the threaded rod.

The present invention further provides a concrete reinforcement assembly, comprising a threaded rod; an anchor body threaded to the rod; and a checker nut engaged tight against the anchor body to lock the anchor body in place; the checker nut including a main body portion having a central opening. A female thread is disposed in the central opening, the thread for cooperating with threads on the threaded rod. A stop member is disposed at a bottom portion of the central opening; and the stop member extends radially inside the central opening to engage a bottom surface of the threaded rod.

The checker nut embodying the present invention replaces the current use of a second hex nut or jam nut with many features and benefits. The checker nut is used adjacent to a threaded body threaded to the same rod as the checker nut to assure complete thread engagement of the threaded body, since the threaded rod or bolt must first extend completely through the threaded body before the checker nut is installed to the threaded rod.

Cast in place concrete anchors are positioned before concrete is poured. One of the most commonly used anchor methods is a length of threaded rod and two hex nuts. One of the nuts is the primary nut which is designed to resist load or to act as the connecting fastener. The secondary nut also assures both nuts will not change relative position. The hex nuts are tightened together against each other at one end of the rod. The present invention replaces one of the hex nuts, called the secondary nut, and adds other features and benefits. The checker nut is short in height, wide in diameter and preferably wider than the adjacent threaded body or hex nut, color coded and partially threaded.

The checker nut threads onto standard, tapered or other threads.

DETAILED DESCRIPTION OF THE INVENTION

Figure 1:
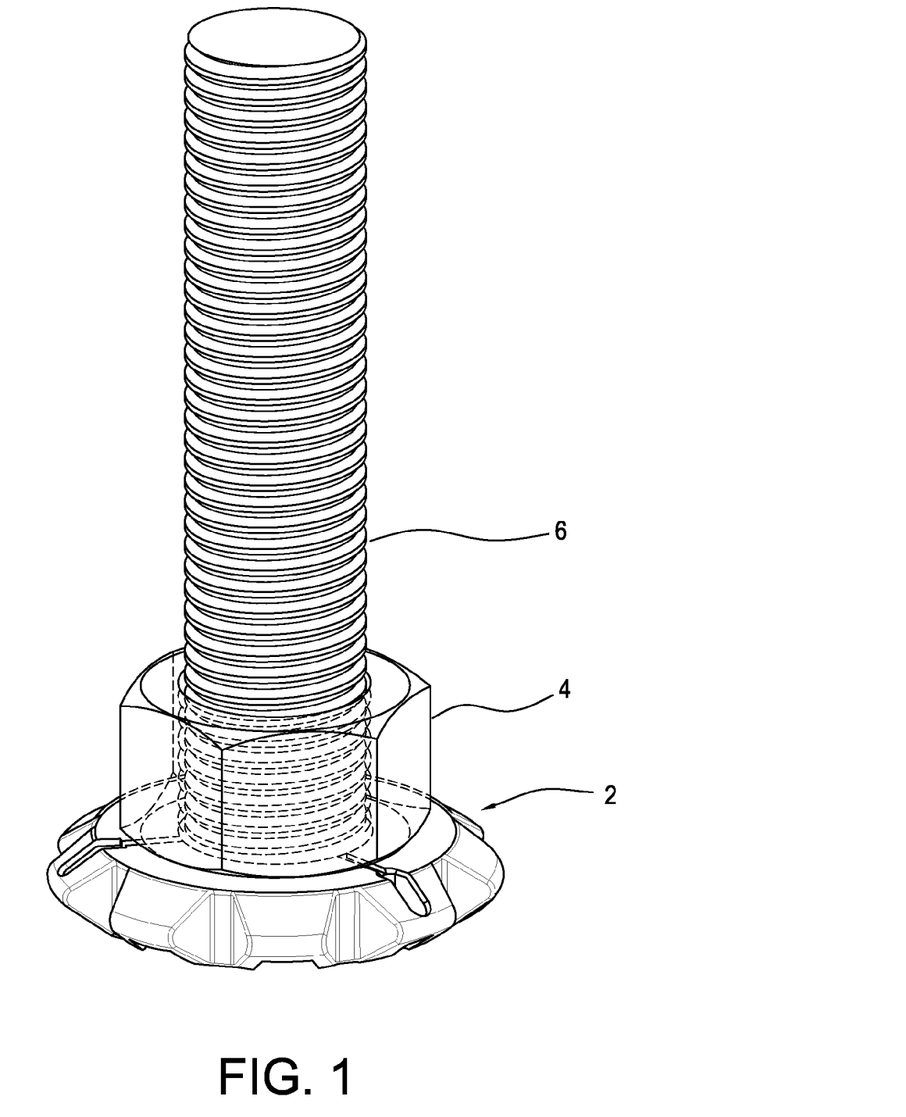
FIG. 1 is a perspective view of an assembly using a checker nut embodying the present invention.

A checker nut 2 embodying the present invention is disclosed in FIG. 1. The checker nut 2 is shown tight against a standard anchor nut 4 threaded to a threaded rod 6. The checker nut 2 is used as a stop to position the nut 4 precisely on the rod 6; and as a lock to tighten the nut 4 on the rod 6. Where the nut 4 is to be embedded in concrete as an anchor, it is desired to maintain the position of the nut 4 along the rod 6 and in relation to the edge of the concrete when the rod is secured in place or when the concrete is vibrated. The checker nut 2 advantageously provides a fixed body against which the nut 4 can be tightened, thus securing the anchor nut 2 in position.

The checker nut 2 may be made with plastic, metal or other suitable material. The checker nut 2 may be made with deformable and resilient material wherein tension is developed within the checker nut 2 when tightened against the anchor nut 4 to help keep the checker nut 2 tight against the anchor nut 4, thereby keeping the anchor nut 4 securely positioned in the threaded rod 6.

The checker nut 2 has an overall diameter larger than the overall diameter of the anchor nut 2 or any anchor body that may be used in place of the nut 2 for tightening or removal by hand. The larger diameter advantageously provides leverage to the user in tightening the checker nut 2 by hand against the anchor nut 4. The larger diameter also provides for easier identification, color coding and visual inspection.

Although a standard hex nut 4 is disclosed, other types of nuts or anchor bodies may be used, such those disclosed in copending application Ser. Nos. 12/656,624 and 12/656,623, herein incorporated by reference. The anchor nut 4 is meant to represent any type of anchor body when it is intended to be embedded in concrete or any threaded body required to be positioned and locked in place on a threaded rod.

Figure 2:
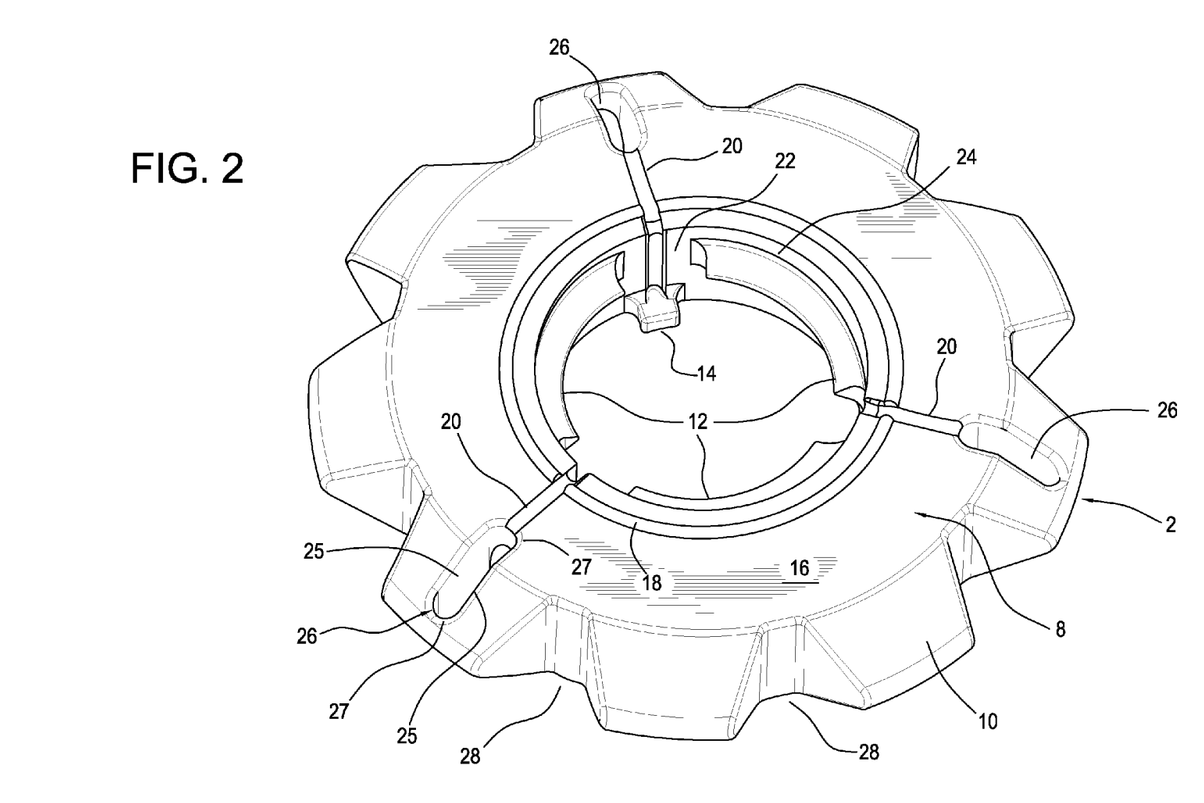
FIG. 2 is a top perspective of the checker nut shown in FIG. 1.

Referring to FIG. 2, the checker nut 2 includes a main body portion 8, a plurality of projections 10 radially extending from the main body portion 8, a plurality of female thread portions 12 and stop members 14. A substantially flat top surface 16 provides a bearing area against which the nut 4 is tightened. The projections 10 extend beyond the outer periphery of the anchor nut 4 to provide the user leverage in turning the checker nut 2 to press and tightening the surface 16 against the anchor nut 4. A friction ring bead 18 projecting above the surface 16 provides a locking engagement with the opposing face of the nut 4. The friction ring bead 18 is raised above the top surface 16 and provides a contour on the bearing surface 16. The ring bead 18 provides a deflection of material and spring like force to keep the anchor nut 4 tight. The ring bead 18 presents a smaller confronting surface to the nut 4 for increased locking force. Accordingly, the bead 18 advantageously provides a stay tight performance.

Figure 3:
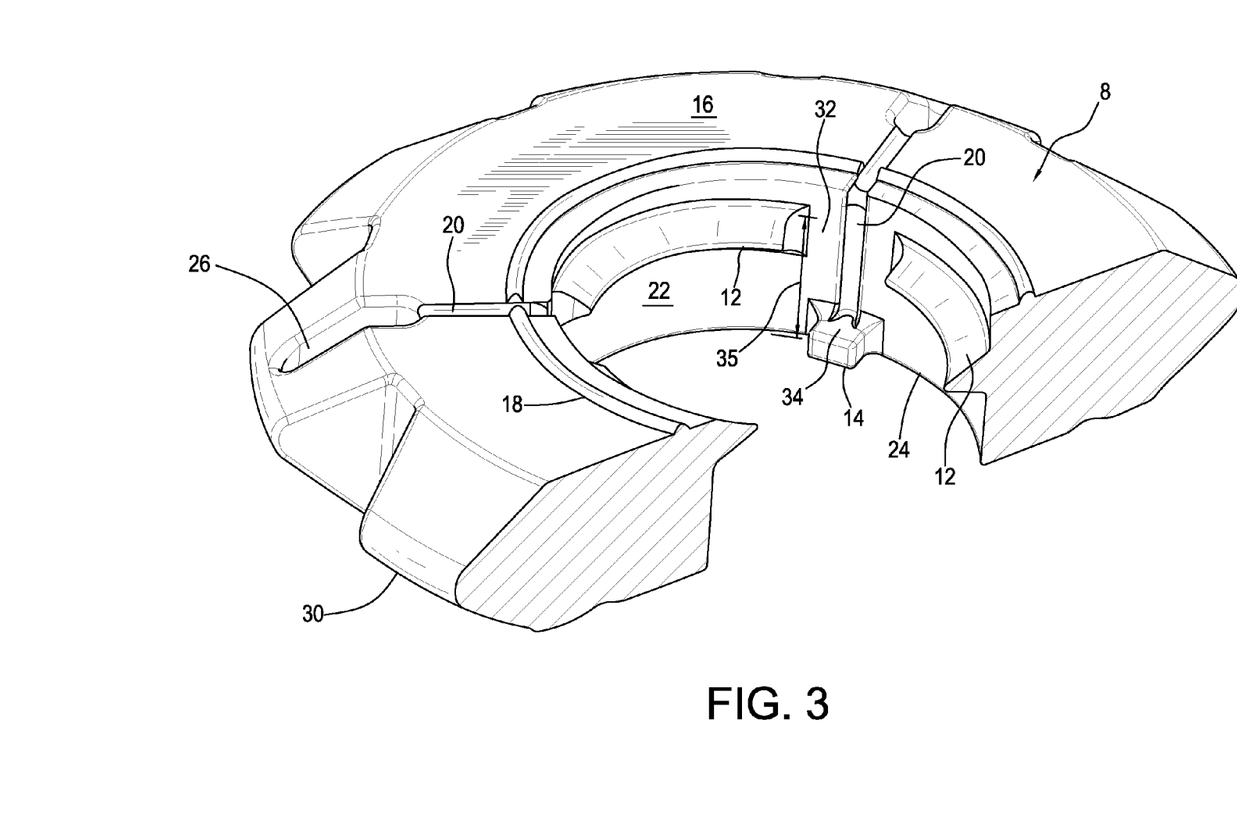
FIG. 3 is a perspective of the checker nut with portion shown in cross-section.

Referring to FIG. 3, channels 20 extend radially on the top surface 16, continue downwardly on the cylindrical surface 22 of the central opening 24 and terminates at the stops 14. The channels 20 advantageously provide a venting function for air and water that may be trapped in the spaces between the valleys of the threads and the cylindrical surface 22. The horizontal portion of the channels 20 that run on the top surface 16 communicates with slotted openings 26 that are oriented axially and radially relative to the main body portion 8 (see FIG. 4). The openings 26 have parallel side walls 25 and curved end walls 27. The openings 26 are used for the nails, screws, tie-wires, etc. that may be employed in securing the rod 6 to an adjacent structure.

The projections 10 are substantially trapezoidal in plan view (see FIG. 4), providing wedge shaped spaces 28 between adjacent projections 10 for accommodating the user's fingers in facilitating the turning of the checker nut 2. The number of the projections 10 is advantageously equated to the diameter or the thread pitch of the rod 6. For example, nine projections 10 means an R9 threaded rod, which is 1⅛ in. dia. rod (1⅛ in. equals 9*⅛). The number of projections 10 may also be equated to the thread pitch of the number of threads per inch of the rod 6. The number of projections 10 thus provides an indicator of the size of the rod 6, the thread pitch or the number of threads per inch of the rod 6. It follows that the number of the projections also provides an indicator of the thread pitch or the number of threads per inch of the female thread portions 12.

Figure 4:
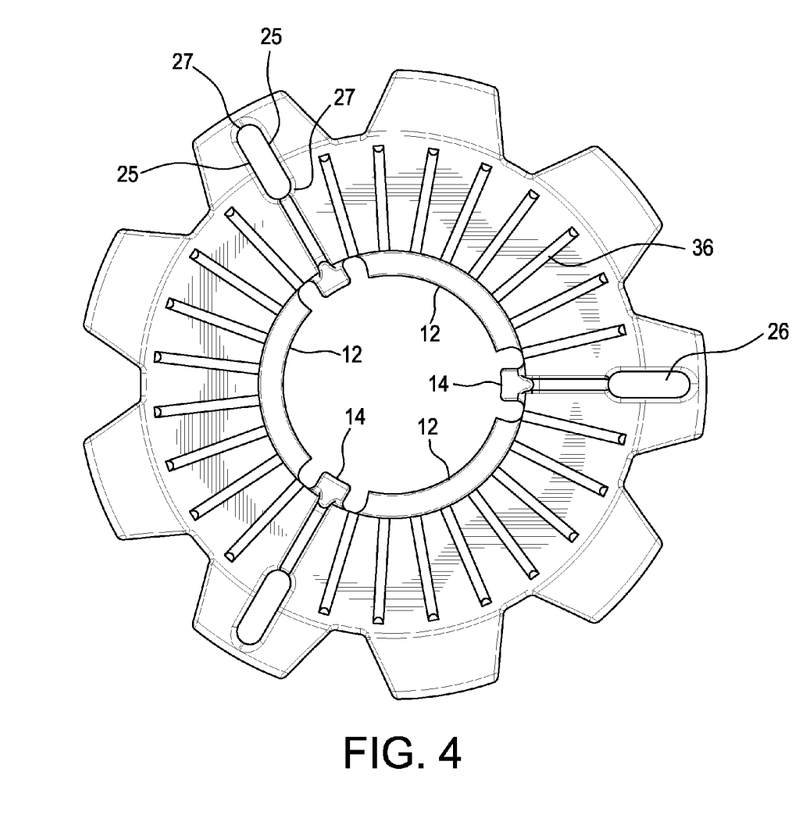
FIG. 4 is top plan view of an embodiment of the checker nut.

It follows that the number of the projections also provides an indicator of the thread pitch or the number of threads per inch of the female thread portions 12. The projections 10 are also substantially triangular in cross-section with apexes 30 forming a segmented circumference around the main body portion 8. The apexes 30 present a smaller surface to the user's hand for increased pressure per unit area to enable the user with a better gripping force on the checker nut 2. The top surface 16 of the main body portion 8 is preferably larger than the bearing surface of the nut 4 so that the projections 10 advantageously extend substantially beyond the periphery of the adjacent nut 4 for clear visual inspection of the checker nut 2 and for ease of turning during installation.

The thread portions 12 together form one complete revolution. Gaps 32 between thread portions 12 are advantageously disposed on the cylindrical surface 22 where the vertical portions of the channels 20 run so as not to interfere with the venting function of the channels 20. Three thread portions 12 are disclosed, but it should be understood that a different number would be just as applicable. The thread portions 12 extend from the cylindrical surface 22 and mate with the threads on the rod 6. The checker nut 2 may be color coded to indicate thread type of the threads 12 or size of the rod 6.

Each stop member 14 is a projection that extends radially into the opening 24 at the bottom of the main body portion 8. The stop 14 has a top surface 34 that confronts the bottom radial surface of the rod 6. The stops 14 position the checker nut 2 at the right location relative to the rod 6. This in turn allows the anchor nut 4 to be positioned at the precise location. Each stop member 14 is preferably positioned at the same level at the bottom end of the cylindrical surface 22.

The vertical or axial distance 35 on the cylindrical surface 22 between the stop member 14 and the thread portion 12 may be configured to set the desired portion (less than one revolution) or number of threads that the anchor nut 4 is desired to pass through (the number of threads that extend outside the anchor nut). If a requirement is to have three treads completely through the anchor nut 4, the thickness of the main body portion 8 may be adjusted to accommodate the required number of threads within the distance 35. The thickness of the main body portion provides an indication of a number of threads contained within the thickness. Accordingly, the overall thickness of the checker nut 2 provides an indication of the number of threads engaged.

Referring to FIG. 4, the ring bead 18 may be replaced with radial beads 36 to provide the same function. The beads 36 are raised above the top surface 16 to provide a smaller confronting surface to the nut 4 for increased locking force. The beads 36 are of a deflectable and spring like material to keep the nut 4 tight against the checker nut 2.

Figure 5:
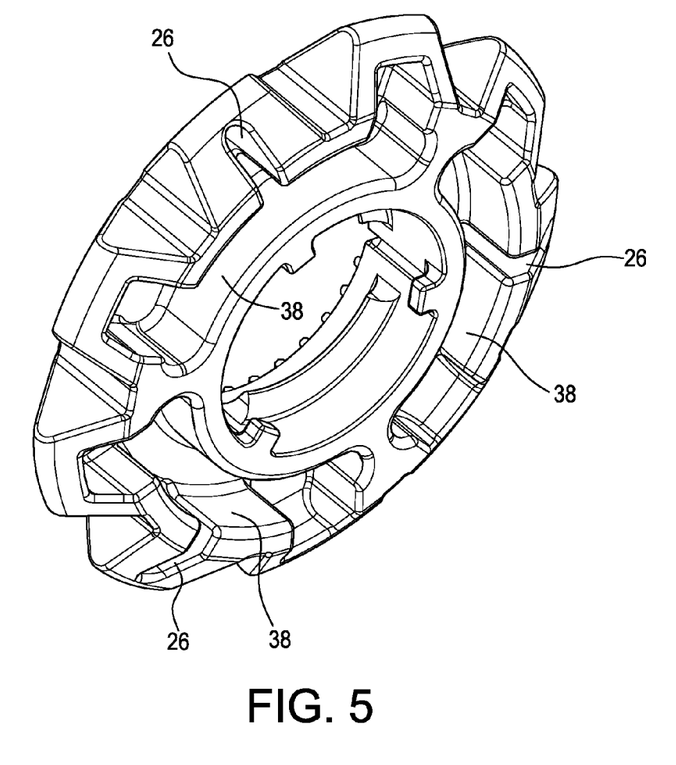
FIG. 5 is bottom perspective view of FIG. 4.

Referring to FIG. 5, the bottom of the main body portion 8 may be hollow, providing cavities 38 that communicate with the respective openings 26. The cavities 38 are configured such that any air bubble that may be trapped within can escape through the openings 26. The cavities 38 advantageously allow lesser material to be used and thus lesser weight for shipping and handling. It should be understood that the cavities 38 may be applied to the embodiments of the checker nut disclosed herein. The checker nut 2 with the cavities 38 may be made with deformable and resilient material to further facilitate the deformation of the checker nut 2 when tightened against the anchor nut 2 to create tension in the threaded rod 6 between the bearing surface 16 and the thread 12 so as to better lock the anchor nut 4 in place.

Figure 6:
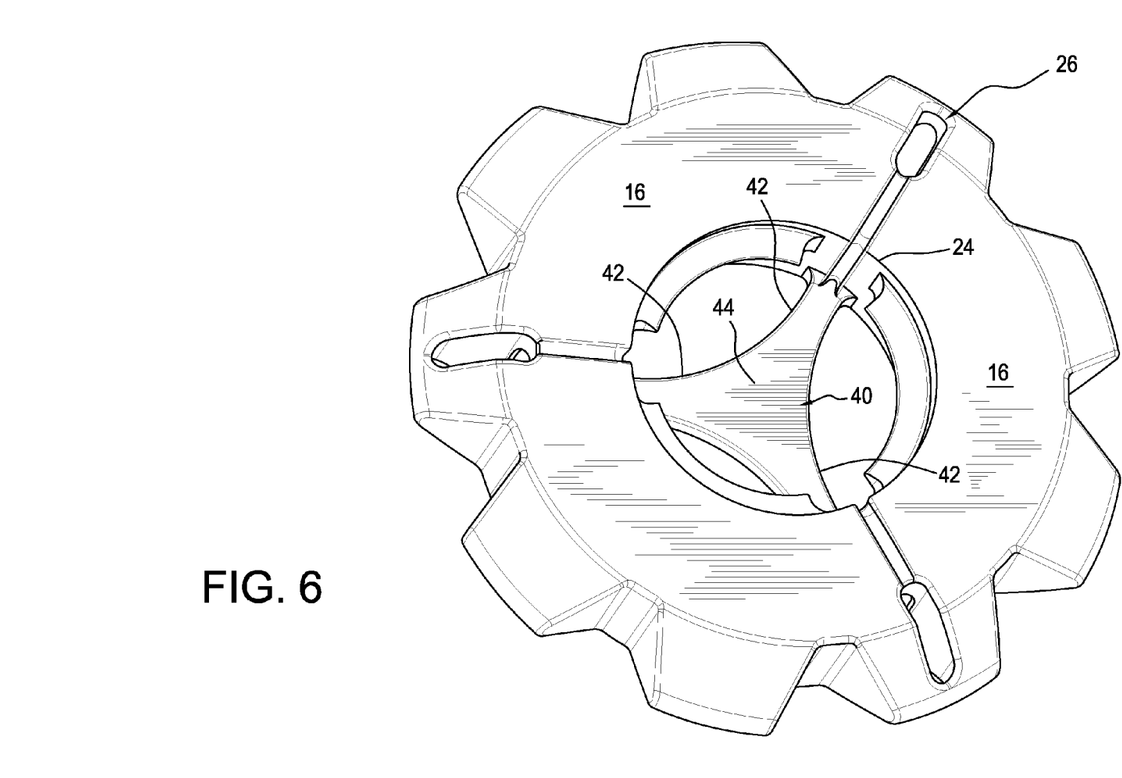
FIG. 6 is a top perspective view of another embodiment of the checker nut.

Referring to FIG. 6, the stop members 14 may be replaced with a substantially triangular stop member 40 that extends across the opening 24. The stop member 40 includes radial arm portions 42 joined at the central portion 44. The radial arms 42 are preferably resilient or able to flex to provide a spring like action against the bottom of the rod 6. In the embodiment shown in FIG. 6, the top surface 16 is substantially flat, without the raised ring bead 8 or the radial beads 36. In addition to the resilient property of the stop member 40, the checker nut 2 may be made of deformable and resilient material to further create tension within the checker nut 2 when tightened against the anchor nut 4.

Figure 7:
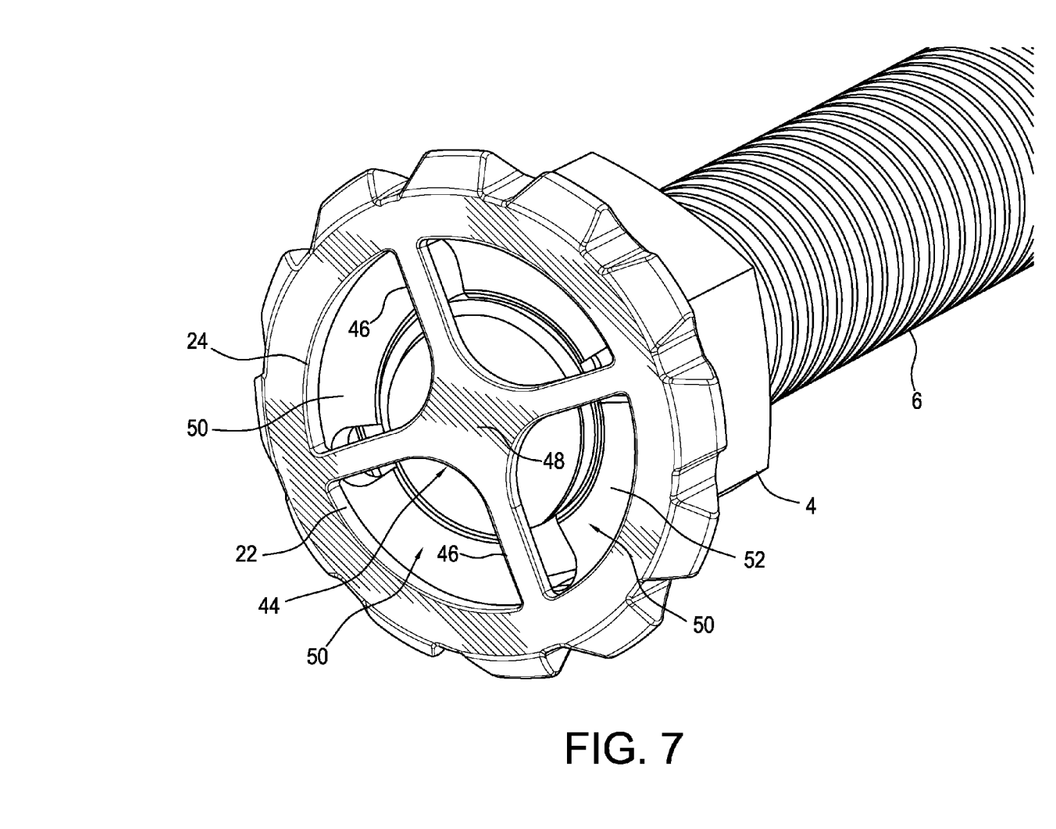
FIG. 7 is a bottom perspective view of an assembly using another embodiment of the checker nut according to the present invention.

Referring to FIG. 7, the stop member 40 may be replaced with a stop member 44 having four radial arms 46 joined at the central portion 48. The stop member 40 is substantially cross-shaped. The radial arms 46 are preferably resilient or able to flex to provide a spring like action against the bottom of the rod 6. From the embodiments of FIGS. 6 and 7, it is understood that the number of the arms that extend across the opening 26 may vary without detracting from the stop function they provide. In the embodiment shown in FIG. 7, although the bottom of the main body portion 8 is shown solid, it can also include the cavities 38 shown in FIG. 5. In addition to the resilient property of the stop member 44, the checker nut 2 may be made of deformable and resilient material to further create tension within the checker nut 2 when tightened against the anchor nut 4.

It should be understood that the stop member 40 or 44 may be used in the other embodiments of the checker nut disclosed herein.

Figure 8:
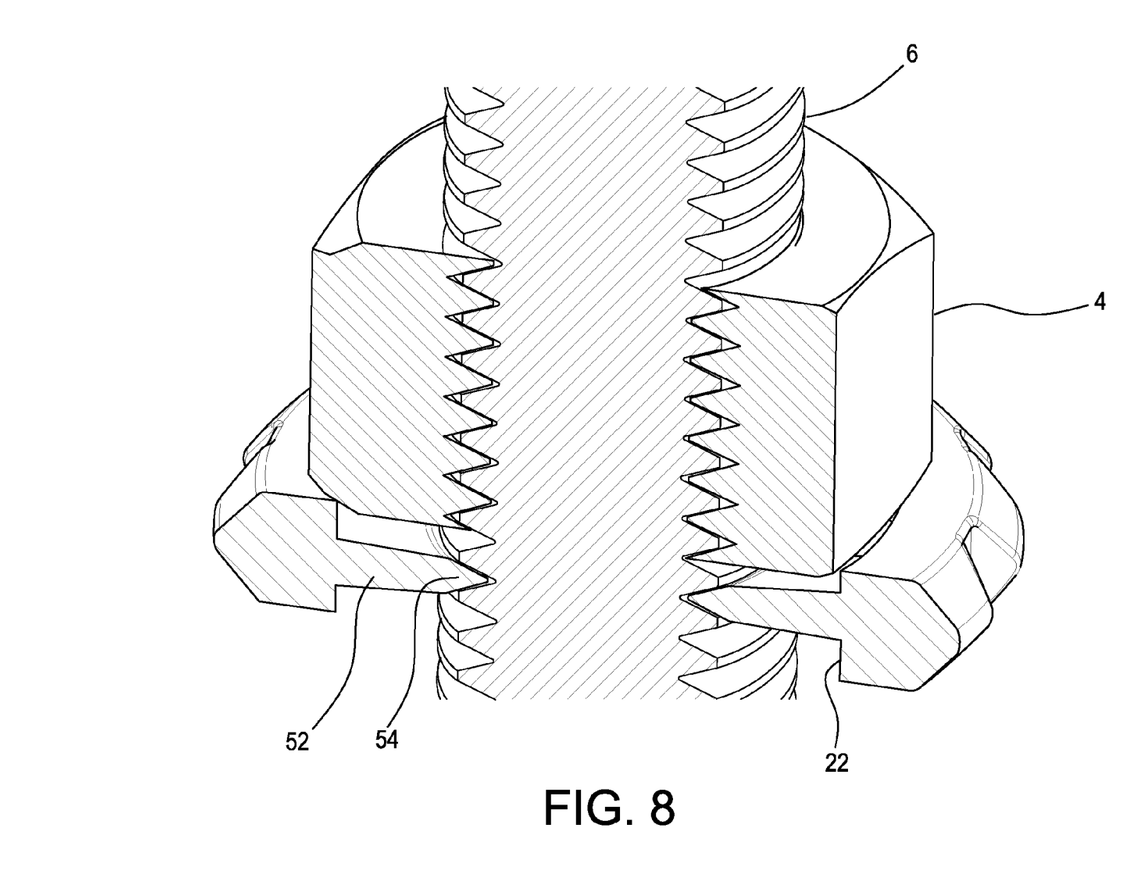
FIG. 8 is a perspective of the assembly of FIG. 7, with portions shown in cross-section.

Referring to FIGS. 7 and 8, extended thread portions 50 substantially extend radially into the opening 24. The thread portions 50 each include an extension member 52 that places the actual threads 54 substantially away from the cylindrical surface 22. The thread portions 50 and the members 52 are flexible that provide a spring like opposite reaction when the nut 4 is tightened against the top surface 16. The members 52 are configured to bend but with resistance in the direction of advance of the nut 4 and has some spring characteristic to make the members 52 want to return to their relaxed position. Accordingly, the checker nut 2 becomes biased toward the nut 4 from the spring action of the members 52. The entire checker nut 2 may be made of deformable and resilient material to further create tension within the checker nut 2 when tightened against the anchor nut 4.

In the embodiment shown in FIG. 8, the checker nut 2 is provided without the stop members 14 or their other embodiments. In this case, the checker nut 2 is able to move past the end of the rod 6 for use in an application where the anchor nut 4 is required to be positioned further away from the end of the rod 6.

Figure 9:
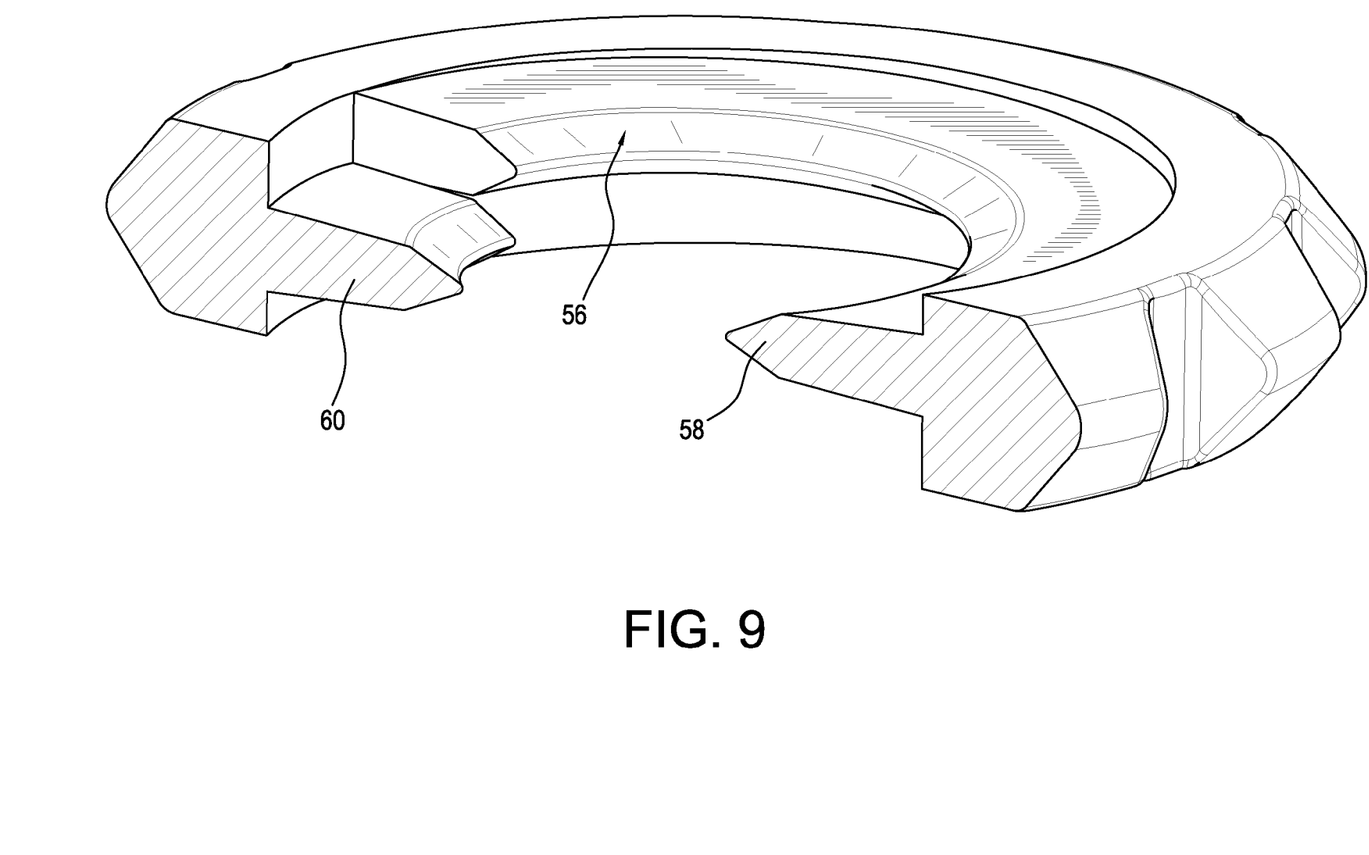
FIG. 9 is a perspective with portions shown in cross-section of another embodiment of the checker nut.

Referring to FIG. 9, the thread portions 50 may be substantially one continuous turn thread 56 without gaps and overlap. The actual thread 58 is substantially one continuous turn. The extending member 60 is also substantially one continuous turn.

It should be understood that the extended thread portion 50 or 56 may be used in the other embodiments of the checker nut disclosed herein.

Figure 10:
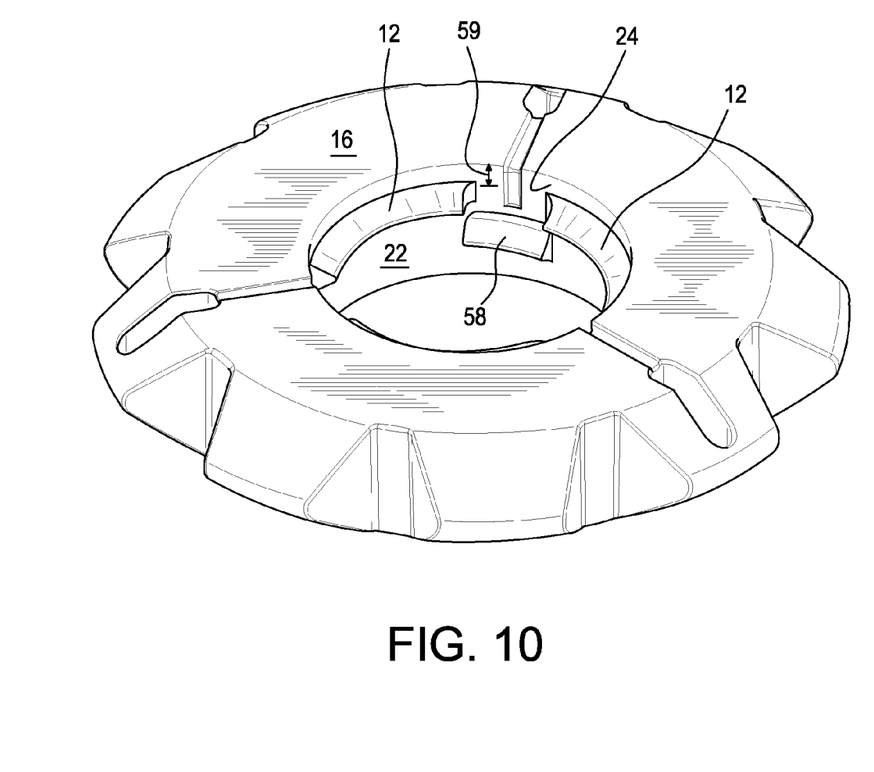
FIG. 10 is a perspective view of another embodiment of the checker nut.

In the embodiments shown with the stop members 14 shown in FIG. 2 or their alternative embodiments shown in FIGS. 6 and 7, the checker nut 2 may be provided with a locking thread portion 58, as shown in FIG. 10, that is slightly offset or misaligned with the other thread portions 12 so as to provide an interference fit, requiring relatively greater force for turning. In this manner, the checker nut shown can be securely located at any position along the length of the rod 6. The locking thread portion 58 may also be applied in the embodiments shown in FIGS. 7 and 9. The locking thread portion 58 allows the thread portions 12 to travel completely through with an increased amount of force required for rotation. The locking thread portion 58 is offset by a small amount so as to interfere with the other thread portions 12. The locking thread portion 58 is made by placing or making locking thread portion 58 outside of tolerances allowed for a particular thread type or pitch.

Referring to FIG. 10, the vertical or axial distance 59 on the cylindrical surface 22 between the thread portion 12 and the top surface 16 may be configured to set the desired portion (less than one revolution) or number of threads that the anchor nut 4 is desired to pass through (the portion or number of threads that extend outside the anchor nut). The number of thread required to pass through may be at least one thread. If a requirement is to have three treads completely through the anchor nut 4, the location of the thread portions 12 on the cylindrical surface 22 may be adjusted so that the distance 59 would accommodate the required number of threads. If the required number of threads are not present on the rod 6, the checker nut 2 will not engage the rod 6. If the checker nut 2 is able to be secured to the rod 6, then it provides a clear indication that the desired number of threads has passed through the anchor nut 4.

Figure 11:
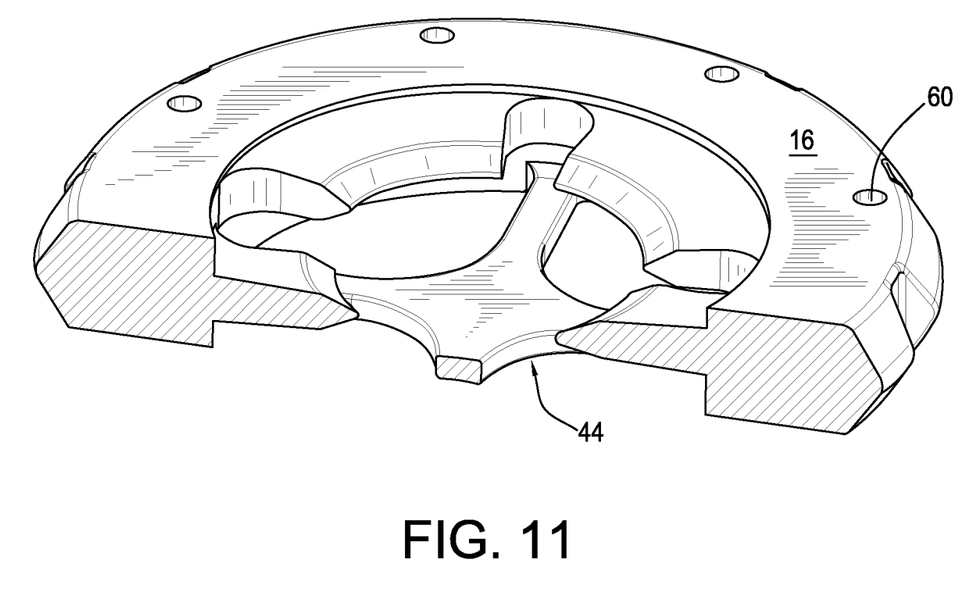
FIG. 11 is a perspective view with portions shown in cross-section of another embodiment of the checker nut.

Referring to FIG. 11, the stop member 44 is shown in combination with the extended thread portions 50. Although not shown, it should be understood that the stop members 14 or the stop member 40 may be used in lieu of the stop member 44. Through holes 60 are provided on the top surface 16 for securing the checker nut to an adjacent structure with screws, tie-wires, nails, etc.

Figure 12:
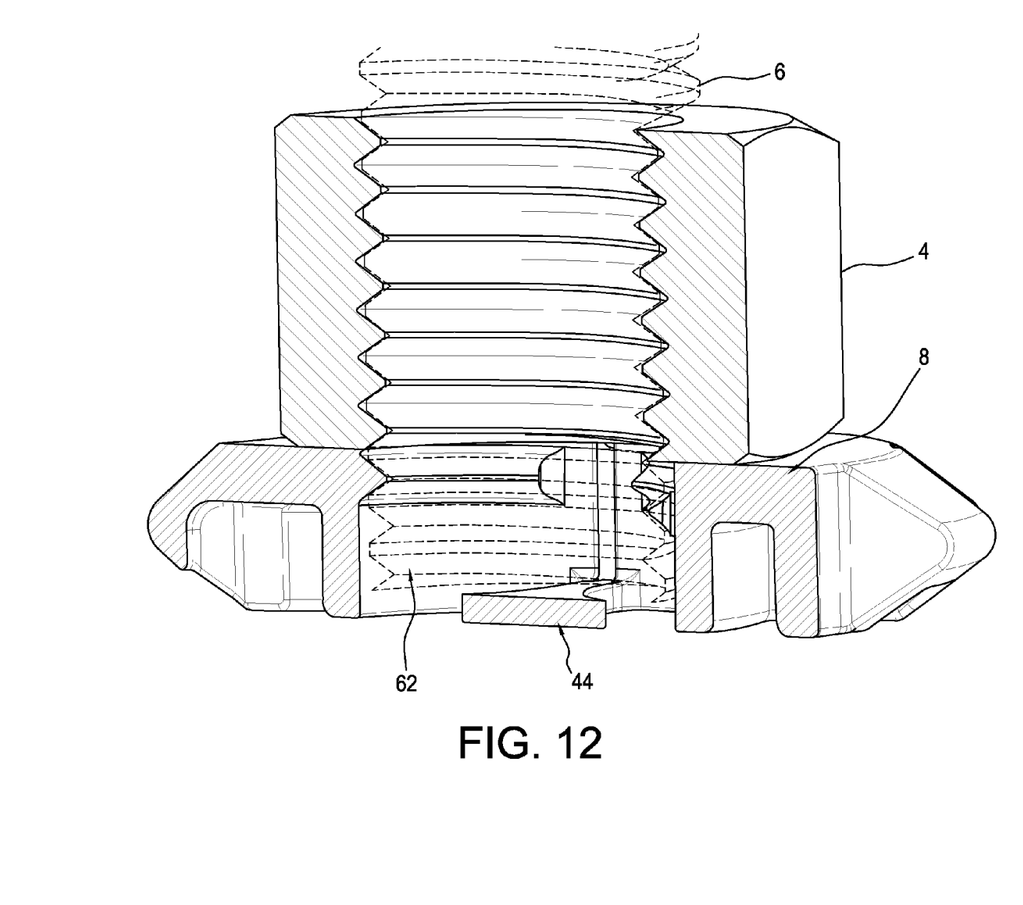
FIG. 12 is a perspective view with portions shown in cross-section of an assembly using another embodiment of the checker nut, where the thread rod is shown in phantom for clarity.

Referring to FIG. 12, an embodiment of the checker nut is disclosed wherein the thickness of the main body portion 8 is configured to receive more than one complete turn of the threads 62 above the stop member 44. In cases where the end of the rod 6 may have been tapered, thereby losing some of the threads at the end, the anchor nut 4 may not have the desired number of complete threads engaged. To prevent this, the checker nut is used to take up all of the damaged or tapered threads within its thicker body, thereby presenting only the good threads to the anchor nut 4. In this manner, a requirement that a specified number of threads, for example three, be contained in the nut 4 is assured.

Figure 13:
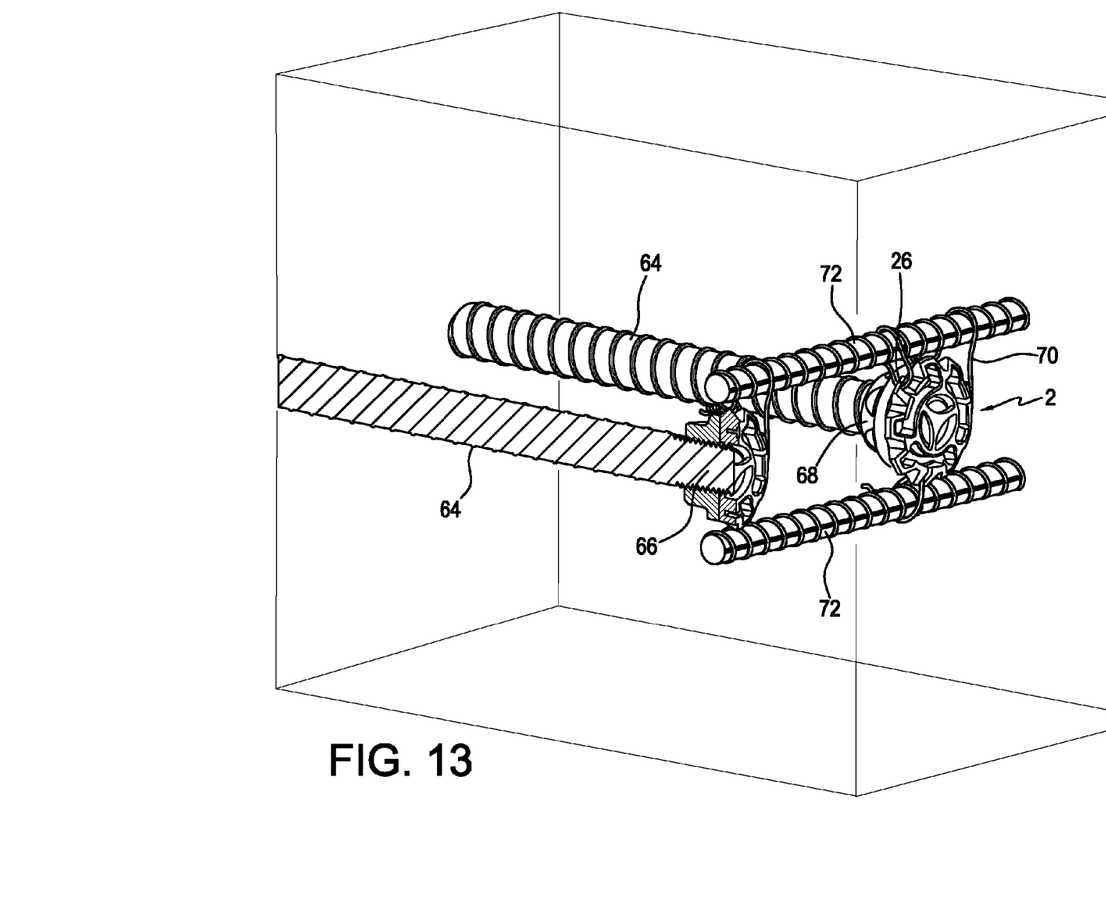
FIG. 13 is a perspective view of an assembly, with portions shown in cross-section, using an embodiment of the checker nut of the present invention.

Referring to FIG. 13, an application of the checker nut 2 is disclosed. The checker nut 2 is shown attached to the end of a reinforcement rod 64 with threaded end portion 66. An anchor nut 68 is screwed tight against the checker nut 2. The holes 26 are used to tie the assembly with tie wires 70 to other reinforcement rods 72. The checker nut 2 holds the anchor nut 68 securely in place, lessening the possibility of getting loosened when the concrete in which the reinforcement assembly is being embedded is vibrated.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A checker nut for locking a threaded body to a threaded rod, comprising:
 a) main body portion having a top bearing surface for engaging a threaded body;
 b) the main body portion including a central opening with an inside surface;
 c) a female thread disposed on the inside surface and extending therefrom, the female thread for cooperating with threads on a threaded rod; and
 d) the female thread is disposed on the inside surface a distance from the top bearing surface equal to at least a thread portion required to be passed by the threaded body on the threaded rod such that the female thread will not engage the threaded rod if the at least a thread portion required to be passed by the threaded body is not present on the threaded rod.

2. A checker nut as in 1, wherein the female thread includes gaps.

3. A checker nut as in claim 1, wherein the female thread forms one complete revolution.

4. A checker nut as in claim 2, wherein:
 a) a channel extends radially on the top bearing surface and continues vertically along the side of the opening; and
 b) the channel in the opening is disposed between a pair of the gaps.

5. A checker nut as in claim 1, and further comprising:
 a) a plurality of female threads; and
 b) main the body portion has a thickness that provides an indication of a number of threads contained within the thickness.

6. A checker nut as in claim 1, and further comprising:
 a) a plurality of radial projections extending from the main body portion;
 b) the projections for extending beyond the outer periphery of a threaded body; and
 c) the projections form wedge-shaped spaces between adjacent projections.

7. A checker nut as in claim 6, wherein the projections are substantially triangular in cross-section with apexes forming a segmented circumference around the main body portion.

8. A checker nut as in claim 6, wherein the number of the projections is an indicator of the thread pitch of the female thread or the size of a rod to which the checker nut will be threaded.

9. A checker nut as in claim 6, wherein the main body portion and the radial projections are color coded to indicate the thread type of the female thread or the size of a threaded rod to which the checker nut will be threaded.

10. A checker nut as in claim 6, wherein the projections are substantially trapezoidal in plan view.

11. A checker nut as in claim 6, wherein:
 a) one of the projections includes a slot; and
 b) the main body portion includes a hollow bottom portion defining a cavity that communicates with the slot.

12. A checker nut as in claim 6, wherein a channel extends radially on the top bearing surface and terminates into a slot in one of the projections.

13. A checker nut as in claim 1, wherein:
 a) a stop member is disposed at a bottom portion of the central opening; and
 b) the stop member extends radially toward the central opening.

14. A checker nut as in claim 13, wherein the stop member includes a top surface configured to engage a bottom surface of a threaded rod to which the checker nut is to be threaded.

15. A checker nut as in claim 13, wherein the stop member includes arms that extend across the central opening.

16. A checker nut as in claim 15, wherein the arms form a substantially triangular shape in plan view.

17. A checker nut as in claim 15, wherein the arms form a cross shape.

18. A checker nut as in claim 15, wherein the arms are resilient.

19. A checker nut as in claim 13, wherein the female thread is disposed a distance from the stop equal to a number of threads on a threaded rod required to be passed by a threaded body.

20. A checker nut as in claim 1, wherein:
 a) the female thread includes gaps to define thread portions separated by respective gaps; and
 b) each of the thread portions includes an extension member to position a respective thread portion substantially into the central opening.

21. A checker nut as in claim 20, wherein each extension member is flexible.

22. A checker nut as in claim 1, and further comprising a locking thread portion slightly misaligned with the female thread to provide an interference fit.

23. A checker nut as in claim 1, wherein:
 a) the main body portion includes a substantially flat top surface; and
 b) a ring bead is disposed on and raised above the top surface.

24. A checker nut as in claim 1, wherein:
 a) the main body portion includes a substantially flat top surface; and
 b) radial beads are disposed on and raised above the top surface.

25. A checker nut as in claim 1, wherein the top bearing surface is larger than a bearing surface of a threaded body to be locked against the checker nut when the checker nut and the threaded body are threaded to a rod.

26. A checker nut as in claim 1, wherein the female thread includes an extension member to position the female thread substantially into the central opening.

27. A checker nut for locking a threaded body to a threaded rod, comprising:
 a) main body portion having a top bearing surface for engaging a threaded body;
 b) the main body portion including a central opening;
 c) a female thread disposed in the central opening, the thread for cooperating with threads on a threaded rod;
 d) a stop member disposed at a bottom portion of the central opening;
 e) the stop member extending radially toward the central opening; and
 f) the stop member including a top surface configured to engage a bottom surface of a threaded rod to which the checker nut is to be threaded.

28. A checker nut as in claim 27, wherein the stop member includes arms that extend across the central opening.

29. A checker nut as in claim 28, wherein the arms form a substantially triangular shape in plan view.

30. A checker nut as in claim 28, wherein the arms form a cross shape.

31. A checker nut as in claim 28, wherein the arms are resilient.

32. A checker nut as in claim 27, wherein:
a) the opening has an inside cylindrical surface;
b) the female thread is disposed on cylindrical surface a distance from the stop equal to a number of threads on a threaded rod required to be passed by a threaded body.

33. A concrete reinforcement assembly, comprising:
a) a threaded rod;
b) an anchor body threaded to the rod;
c) a checker nut engaged tight against the anchor body to lock the anchor body in place;
d) the checker nut including a main body portion having a central opening with a cylindrical inside surface;
e) a female thread disposed on the cylindrical inside surface and extending therefrom, the female thread for cooperating with threads on the threaded rod; and
f) the female thread is disposed on the cylindrical surface a distance from the top bearing surface equal to at least one thread required to be passed by the anchor body on the threaded rod.

34. A checker nut as in claim 33, wherein:
a) a stop member is disposed at a bottom portion of the central opening; and
b) the stop member extends radially toward the central opening.

35. A checker nut as in claim 34, wherein the stop member includes a top surface configured to engage a bottom surface of a threaded rod to which the checker nut is to be threaded.

36. A checker nut as in claim 33, and further comprising a locking thread portion slightly misaligned with the female thread to provide an interference fit.

37. A checker nut as in claim 33, wherein the checker nut is deformable to develop tension in the threaded rod between the thread and the top bearing surface when the body is tightened against the threaded body.

38. A concrete reinforcement assembly, comprising:
a) a threaded rod;
b) an anchor body threaded to the rod;
c) a checker nut engaged tight against the anchor body to lock the anchor body in place;
d) the checker nut including a main body portion having a central opening;
e) a female thread disposed in the central opening, the thread for cooperating with threads on the threaded rod;
f) a stop member disposed at a bottom portion of the central opening;
g) the stop member extending radially toward the central opening to engage a bottom surface of the threaded rod;
h) the central opening including an inside cylindrical surface;
i) the female thread extending from the cylindrical surface; and
j) the female thread is disposed a distance on the cylindrical surface from the stop member equal to a number of threads on the threaded rod required to be passed by the anchor body.

39. A concrete reinforcement assembly as in claim 38, wherein the stop member includes resilient arms that extend across the central opening.

40. A checker nut for locking a threaded body to a threaded rod, comprising:
a) a body having a top bearing surface for engaging a threaded body;
b) the body including a central opening;
c) a female thread disposed in the central opening, the thread for cooperating with threads on a threaded rod;
d) the body extending beyond the outer periphery of a threaded body to be locked by the checker nut on a threaded rod to provide leverage to a user to tighten the top bearing surface against the threaded body; and
e) the body being deformable to develop tension in the threaded rod between the thread and the top bearing surface when the body is tightened against the threaded body.

41. A checker nut as in claim 40, and further comprising radial projections extending from the body.

* * * * *